US009811658B2

(12) United States Patent
Martini et al.

(10) Patent No.: US 9,811,658 B2
(45) Date of Patent: Nov. 7, 2017

(54) SELECTIVELY CAPTURING VIDEO IN A VIRTUAL ENVIRONMENT BASED ON APPLICATION BEHAVIOR (71) Applicant: iBoss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

(*) Notice: Subject to any disclaimer, the term of this patent is extended or adjusted under 35 U.S.C. 154(b) by 0 days.

(21) Appl. No.: 14/811,800

(22) Filed: Jul. 28, 2015

(65) Prior Publication Data

US 2016/0026798 A1 Jan. 28, 2016

Related U.S. Application Data (60) Provisional application No. 62/030,043, filed on Jul. 28, 2014.

(51) Int. Cl.
G06F 11/00 (2006.01)
G06F 21/53 (2013.01)
H04L 29/06 (2006.01)
G06F 21/55 (2013.01)
G06F 9/455 (2006.01)
G06F 21/56 (2013.01)

(52) U.S. Cl.
CPC .............. G06F 21/53 (2013.01); G06F 9/455 (2013.01); G06F 9/45558 (2013.01); G06F 21/552 (2013.01); G06F 21/566 (2013.01); H04L 63/14 (2013.01); H04L 63/1408 (2013.01); G06F 2009/45587 (2013.01); G06F 2221/033 (2013.01); G06F 2221/034 (2013.01)

(58) Field of Classification Search
CPC ..................................................... G06F 21/577
USPC ....................................................... 726/22–25
See application file for complete search history.

(56) References Cited

U.S. PATENT DOCUMENTS 8,984,585 B2* 3/2015 Martini .................... H04N 9/79
726/1
9,117,079 B1 8/2015 Huang
2005/0166072 A1* 7/2005 Converse ............ H04L 63/1441
726/5
2008/0320595 A1 12/2008 VanDerMade
(Continued)

OTHER PUBLICATIONS

Biasing et al., "An Android Application Sandbox system for suspicious software detection," 2010 5th International Conference on Malicious and Unwanted Software Year: 2010 pp. 55-62.*
(Continued)

Primary Examiner — Roderick Tolentino
(74) Attorney, Agent, or Firm — Fish & Richardson P.C.

(57) ABSTRACT

One example method includes executing a software application within the virtual machine environment; during execution of the software application, detecting one or more actions specified by a malicious application policy being performed by the software application within the virtual machine environment, the malicious application policy specifying one or more actions that will trigger video capture in the virtual machine environment executing the software application; and initiating capture of a video signal of the virtual machine environment in response to detecting the one or more actions specified by the malicious application policy.

21 Claims, 4 Drawing Sheets

(56) References Cited

U.S. PATENT DOCUMENTS

| | | | |
|---|---|---|---|
| 2009/0271867 A1 | 10/2009 | Zhang | |
| 2009/0300599 A1* | 12/2009 | Piotrowski | G06F 21/53 |
| | | | 717/174 |
| 2010/0002882 A1 | 1/2010 | Rieger | |
| 2010/0115621 A1 | 5/2010 | Staniford | |
| 2011/0154326 A1* | 6/2011 | Au | G06F 9/45533 |
| | | | 718/1 |
| 2011/0167494 A1 | 7/2011 | Bowen | |
| 2011/0231696 A1* | 9/2011 | Ji | G06F 11/1438 |
| | | | 714/3 |
| 2011/0239291 A1* | 9/2011 | Sotka | H04L 63/1416 |
| | | | 726/14 |
| 2012/0030303 A1 | 2/2012 | Souza | |
| 2013/0091564 A1* | 4/2013 | Fitzgerald | G06F 21/88 |
| | | | 726/17 |
| 2013/0125119 A1* | 5/2013 | Vipat | G06F 9/45533 |
| | | | 718/1 |
| 2013/0283370 A1* | 10/2013 | Vipat | G06F 21/44 |
| | | | 726/17 |
| 2013/0305368 A1 | 11/2013 | Ford | |
| 2014/0282619 A1 | 9/2014 | Michie | |
| 2015/0007325 A1* | 1/2015 | Eliseev | G06F 21/566 |
| | | | 726/24 |
| 2015/0350047 A1 | 12/2015 | Bird | |

OTHER PUBLICATIONS

Bisio et al., "Semi-supervised machine learning approach for unknown malicious software detection," 2014 IEEE International Symposium on Innovations in Intelligent Systems and Applications (INISTA) Proceedings Year: 2014 pp. 52-59.*

Bai, et al., "Approach for malware identification using dynamic behaviour and outcome triggering." IET Information Security vol. 8, No. 2 (2014), pp. 140-151.

* cited by examiner

SELECTIVELY CAPTURING VIDEO IN A VIRTUAL ENVIRONMENT BASED ON APPLICATION BEHAVIOR

BACKGROUND

This specification generally relates to selectively capturing video in a virtual environment based on application behavior.

Virtual machine environments emulate physical hardware components of a computer system (e.g., processors, memory, network interfaces, etc.) in software. In such environments, executing software applications are isolated from hardware resources that could allow for problematic changes effecting other systems. For example, a malicious software program executing in a virtual machine environment may be able to corrupt the emulated memory resources of its own virtual environment, but it will not permitted to make changes outside this emulated "sandbox."

SUMMARY

In general, one aspect of the subject matter described in this specification may be embodied in systems, and methods performed by data processing apparatuses that include the actions of executing a software application within the virtual machine environment. During execution of the software application, detecting one or more actions specified by a malicious application policy being performed by the software application within the virtual machine environment, the malicious application policy specifying one or more actions that will trigger video capture in the virtual machine environment executing the software application. The actions include initiating capture of a video signal of the virtual machine environment in response to detecting the one or more actions specified by the malicious application policy.

Implementations can include any, all, or none of the following features. The detecting the one or more actions includes detecting the software application attempting to access a particular network address or domain within the virtual machine environment. The detecting the one or more actions includes detecting the software application attempting to change a particular registry setting within the virtual machine environment. The detecting the one or more actions includes detecting the software application accessing a particular application programming interfaces (API) within the virtual machine environment. The detecting the one or more actions includes detecting processor utilization within the virtual machine environment exceeding a threshold value. The detecting the one or more actions includes detecting memory utilization within the virtual machine environment exceeding a threshold value. The detecting the one or more actions includes detecting the software application attempting to access a particular file system location within the virtual machine environment. Initiating capture of the video signal of the virtual machine environment includes instructing an agent executing within the virtual machine environment to begin capturing the video signal. The actions can include executing the software application within the virtual machine environment is performed in response to detecting actions performed by the software application while executing on a particular computing device outside the virtual machine environment. The actions can include removing the particular computing device from a network in response to detecting the actions performed by the software application while executing on the particular computing device outside the virtual machine environment.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Virtual machine environments (e.g., "sandbox" environments) may be used to analyze the behavior of executing software applications. The present disclosure describes techniques to selectively trigger capture of a video signal produced by the virtual machine environment (e.g., by a virtual display adapter emulating a physical display adapter to an executing software application). Such a capture may be initiating upon identification of a potentially malicious software application (e.g., a virus). For example, if a potentially malicious program is identified, it may be run in a virtual machine instance to observe its behavior. This behavior may include network activity, file access, registry updates, application launches, use of specific APIs or specific API calls, processor and memory utilization, or other types of behavior. Based on the observed behavior, recording of the video signal of the virtual machine may be triggered. For example, if a potential malicious program attempts to access a particular network address or domain (e.g., an address of a known botnet), recording a video signal produced by the virtual machine may be triggered. In another example, if a potential malicious program attempts to change a particular registry setting within the virtual machine, recording of the video signal may be triggered. If the potential malicious program attempts to access a particular file, recording the video signal may be triggered. In some implementations, recording of the video signal may be triggered by an agent running within the virtual machine as described elsewhere in the present disclosure. In some cases, the potential malicious program may be identified automatically, such as by a software application running on the same computer. In such a case, the potential malicious program may be transferred off the particular computer and a virtual machine environment may be set up automatically to analyze the potential malicious program. The particular computer may be quarantined (e.g. isolated from the rest of the network) while this analysis is occurring.

As previously stated, the techniques for triggering and managing recording video described herein with respect to a computer connected to the physical network may be adapted and used with respect to a virtual machine environment. For example, rather than running on a separate server or computer, a monitoring program for triggering recording may run on the same computing device as the virtual machine, and may monitor data sent by potential malicious program on virtual network adapters. In some implementations, the monitoring program may be executed by or integrated with a hypervisor program for managing the virtual machine. In some cases, the monitoring program for triggering the recording may execute inside a separate virtual machine running alongside the virtual machine running the potential malicious program.

In such a sandbox environment, a "communication sandboxing" or "request sandboxing" technique may also be implemented. Network requests sent by the virtual machine may be intercepted by an external monitoring program, such as a network monitor running on an external computer, or running on the same computing device as the virtual machine. The monitoring program may emulate the expected behavior of the other side of the connection in order to determine how the potential malicious program will behave. For example, a monitoring program may intercept a Hypertext Transfer Protocol (HTTP) POST request from a malicious program running in the virtual machine. The monitoring program may receive and store the data set with the POST request and store it for later analysis. The monitoring program may also respond to the potential malicious program with an expected response, such as an HTTP 200 OK response. By responding this way, the potential malicious program will continue executing as normal as it will treat the request as having completed successfully. By emulating the server side of this interaction in such a manner, the potential malicious program may execute longer, and produce more data for analysis. Also, the data transferred by the potential malicious program is now stored, and may be analyzed to determine what data the potential malicious program was attempting to transfer. In some cases, the monitoring program may be operable to emulate the server side of the connection for many different communications protocols, such as, for example, HTTP, HTTPS, The Onion Router (TOR) Hidden Service Protocol, File Transfer Protocol (FTP), Secure Shell (SSH), Secure Socket Layer (SSL), Secure Copy (SCP), Remote Copy (RCP), Trivial FTP (TFTP), Apple Filing Protocol (AFP), Server Message Block (SMB), Network File System (NFS), WebDAV, and other protocols. The monitoring program may also be operable to emulate a peer in peer-to-peer communications protocols such as BitTorrent, FastTrack, Skype, or other protocols.

Another technique, known as "file baiting," maybe used to attempt to elicit malicious behavior from a potential malicious program. In file baiting, files or other resources containing certain types of information are inserted into the virtual machine. Some malicious programs may scan the computer on which their executing periodically looking for sensitive or other types of information to transfer off of the computer, such as passwords, Social Security numbers, credit card numbers, or other types of information. File baiting involves inserting files with certain attributes or containing certain information into the virtual machine to elicit this behavior. For example, a file called "password.txt" may be created on the desktop to attempt to elicit behavior from the potential malicious program. If the program access the file, an action can be triggered, such as, for example video recording or logging to observe the behavior. In some cases, these baiting techniques may include configuring the virtual machine with various security flaws or misconfigurations that are likely to be exploited by malicious programs. For example, a virtual machine may be initialized without a specific security update installed in order to elicit behavior from the malicious program. The virtual machine may also be configured with default settings, such as default passwords, known to be exploited by malicious programs.

Figure 1:
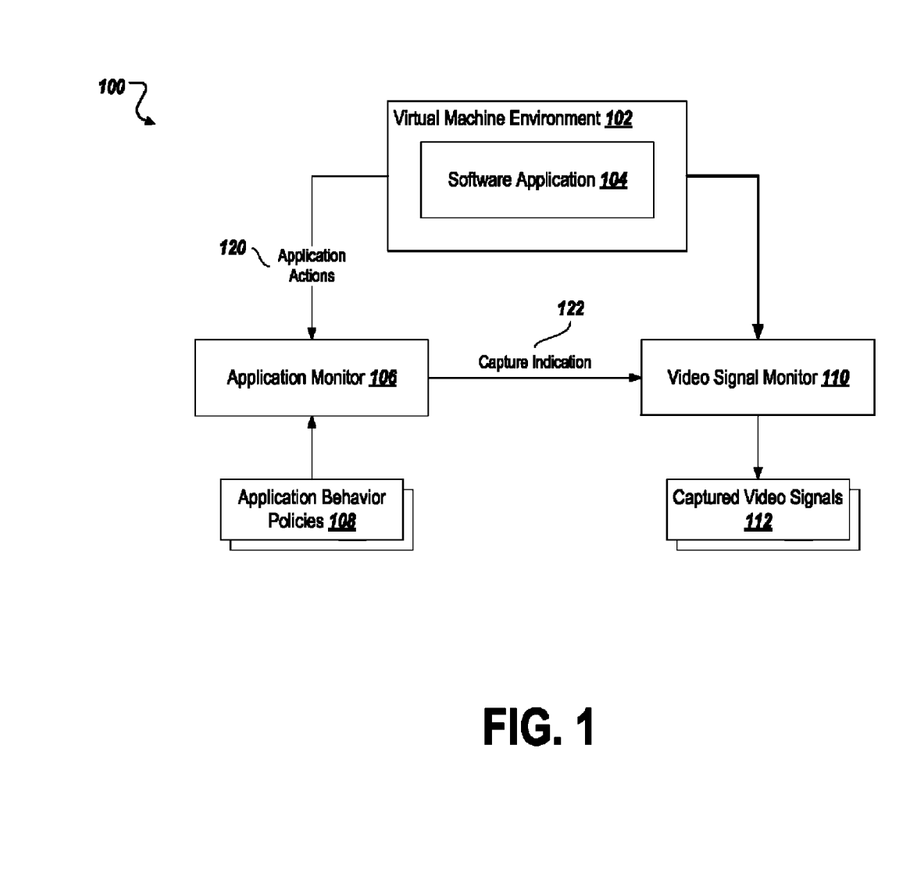
FIG. 1 is a diagram of an example environment.

FIG. 1 is a diagram of an example environment for selectively capturing video based on application behavior. The environment 100 includes a virtual machine environment 102 executing a software application 104. The virtual machine environment 102 is connected to an application monitor 106 and a video signal monitor 110. In operation, the virtual machine environment 102 executes the software application 104, and provides a stream of actions 120 requested by the software application 104 to the application monitor 106. The application monitor 106 analyzes the received actions 122 determine if the actions match one of the application behavior policies 108. The application behavior policies 108 specify actions configured to trigger capturing of a video signal produced by the virtual machine environment 102. If the actions analyzed by the application monitor 106 match actions specified in an application behavior policy 108, the application monitor 106 since a capture indication 122 to the video signal monitor 110 to initiate capturing of the video signal. The video signal monitor 110 stores captured video signals 112 for later analysis.

The virtual machine environment 102 may be a software application executing on a computing device, such as a hypervisor brother virtual machine instance manager. The software application 104 may be executed inside a virtual machine instance managed by the virtual machine environment 102. The virtual machine environment 102 may provide emulated hardware resources to the software application 104, such as, for example, software components representing processors, memory devices, network adapters, display adapters, or other resources. The virtual machine environment 102 may be operable to provide requests by the software application 104 to use any of these emulated resources to the application monitor 106 as requested actions 120. For example, the virtual machine environment 102 may provide instructions issued by the software application 104 to an emulated processor during execution, requests made by the software application 104 to an emulated memory device during execution, or other actions to the application monitor 106.

The application monitor 106 may be a software application executing on the same computing device as the virtual machine environment 12, or executing on a different computing device and communicating with the virtual machine environment 102 over a network. The application behavior policies 108 may be stored on the same computing device as the application monitor 106, or a separate storage location such as a database. The application behavior policies 108 may specify particular actions, sequences of actions, or types of actions, that, when observed by the application monitor 106, will trigger the initiation of video capture.

The video signal monitor 110 media software application executing outside the virtual machine environment 102 as shown, or may be a software agent executing within the virtual machine environment 102. In some implementations, the video signal monitor 110 may receive video data from an emulated display resource maintained by the virtual machine environment 2. By analyzing the captured video data, and administrator can determine what actions the software application 104 is tempting to perform, and determine how software application 104 will present itself to user. Such diagnostic information may be useful in determining whether the software application 104 is a malicious program such as a virus.

Figure 2:
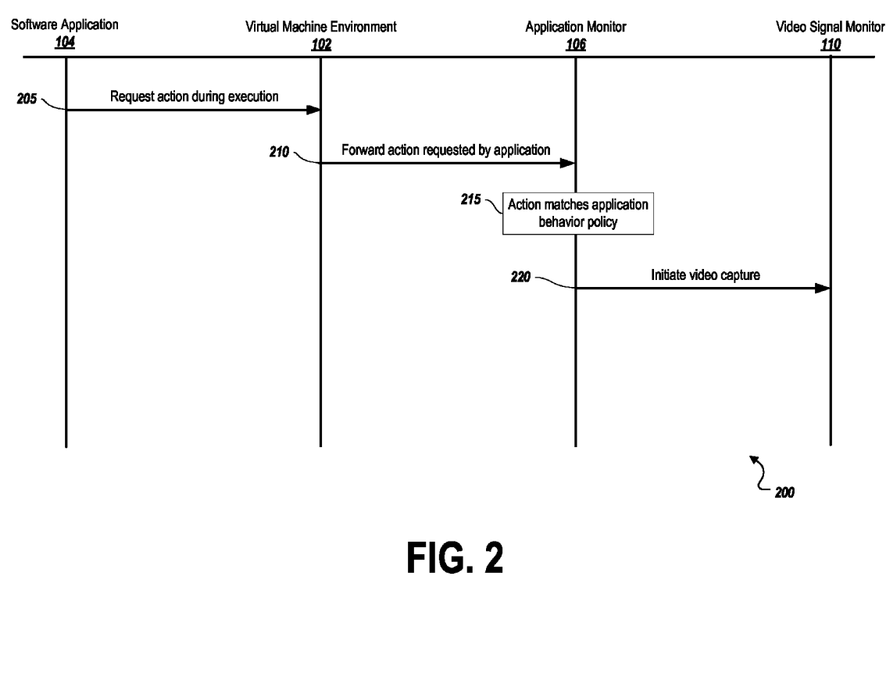
FIG. 2 is a message flow diagram of an example interaction between the components of the example environment to selectively capture video based on application behavior.

FIG. 2 is a message flow diagram of an example interaction between the components of the example environment to selectively capture video based on application behavior. At 205, the software application 104 requests an action during execution in the virtual machine environment 102. At 210, the virtual machine environment 102 forwards the requested action to the application monitor 106. At 215, the application monitor 106 determines that the requested action matches one of the application behavior policies 108. At 220, the application monitor 106 signals the video signal monitor to initiate video capture.

Figure 3:
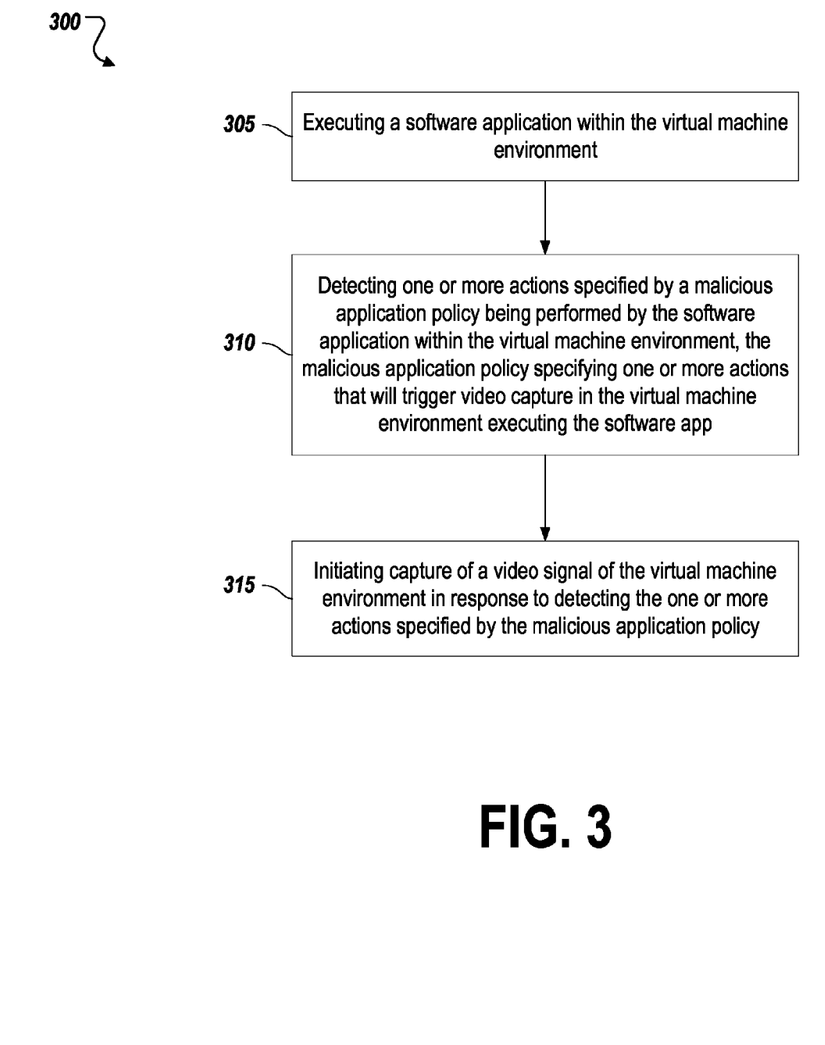
FIG. 3 is a flow chart of an example process of selectively capturing video based on application behavior.

FIG. 3 is a flow chart of an example process of selectively capturing video based on application behavior. At 305, a software application is executed within the virtual machine environment. In some cases, executing the software application within the virtual machine environment is performed in response to detecting actions performed by the software application while executing on a particular computing device outside the virtual machine environment. The process 300 may also include removing the particular computing device from a network in response to detecting the actions performed by the software application while executing on the particular computing device outside the virtual machine environment.

At 310, during execution of the software application, one or more actions are detected specified by a malicious application policy being performed by the software application within the virtual machine environment, the malicious application policy specifying one or more actions that will trigger video capture in the virtual machine environment executing the software application. In some cases, detecting the one or more actions includes detecting the software application attempting to access a particular network address or domain within the virtual machine environment. In some implementation, detecting the one or more actions includes detecting the software application attempting to change a particular registry setting within the virtual machine environment. Detecting the one or more actions includes detecting the software application accessing a particular application programming interfaces (API) within the virtual machine environment. In some cases, detecting the one or more actions includes detecting processor utilization within the virtual machine environment exceeding a threshold value. Detecting the one or more actions may include detecting memory utilization within the virtual machine environment exceeding a threshold value. Detecting the one or more actions may also include detecting the software application attempting to access a particular file system location within the virtual machine environment.

At 315, capture of a video signal of the virtual machine environment in response to detecting the one or more actions specified by the malicious application policy. Initiating capture of the video signal of the virtual machine environment may include instructing an agent executing within the virtual machine environment to begin capturing the video signal.

Figure 4:
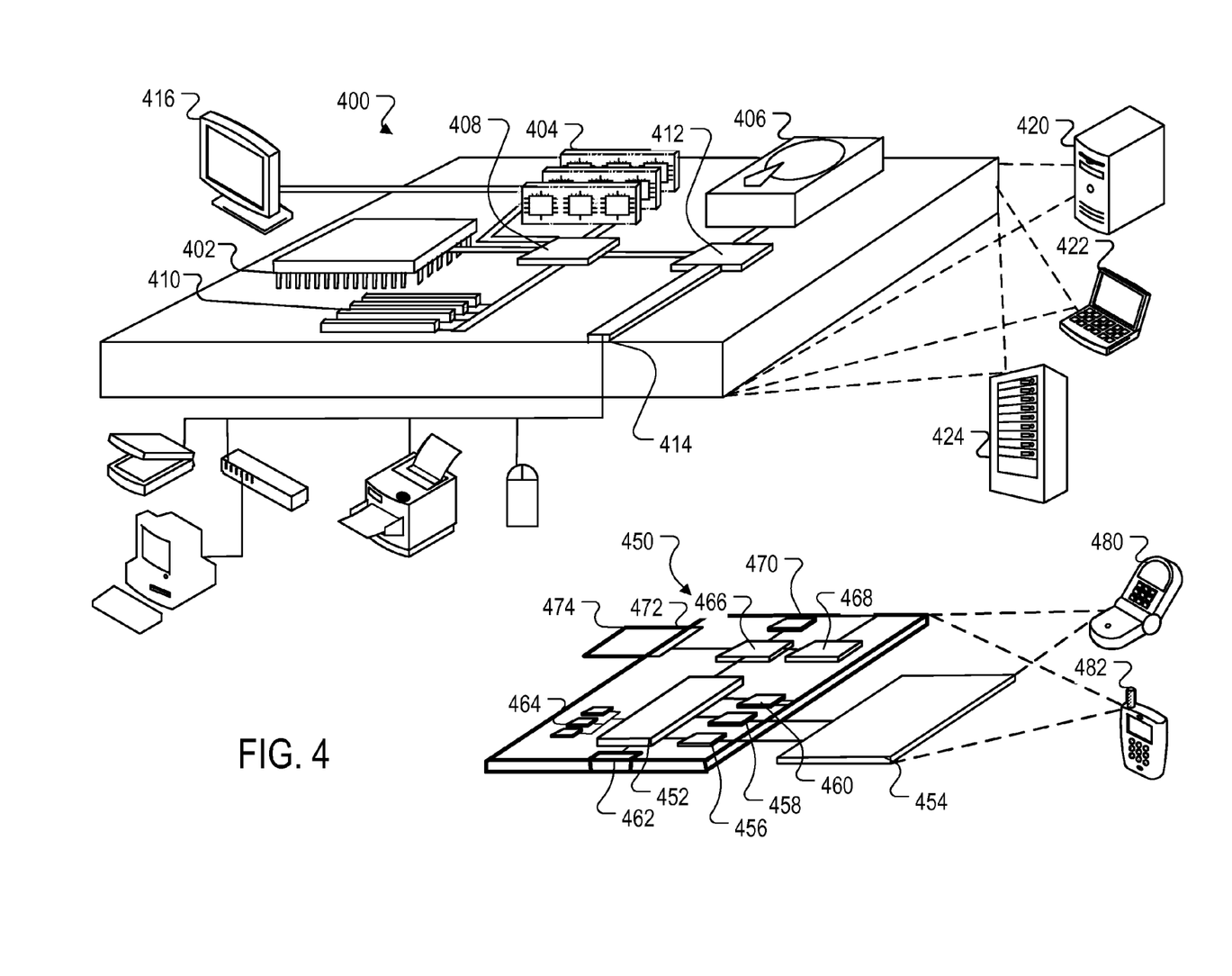
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The invention claimed is:

1. A computer-implemented method executed by one or more processors for selectively capturing video signals of malicious software applications in a virtual machine environment, the method comprising:
   executing a software application within the virtual machine environment, wherein the virtual machine environment provides emulated hardware resources to the executing software application, wherein one of the emulated hardware resources is a virtual display adaptor emulating a physical display adaptor to the executing software application;
   during execution of the software application, detecting one or more actions specified by a malicious application policy being performed by the software application within the virtual machine environment, the malicious application policy specifying one or more actions that will trigger video capture in the virtual machine environment executing the software application;
   initiating capture, by the virtual display adaptor of the virtual machine environment, of a video data of behavior of a user interface of the execution of the software application that is executing within the virtual machine environment; and
   analyzing the captured video data for actions the software application is attempting to perform, and how the software application will present itself to a user, in order to determine whether the software application is a malicious application.

2. The method of claim 1, wherein the detecting the one or more actions includes detecting the software application attempting to access a particular network address or domain within the virtual machine environment.

3. The method of claim 1, wherein the detecting the one or more actions includes detecting the software application attempting to change a particular registry setting within the virtual machine environment.

4. The method of claim 1, wherein the detecting the one or more actions includes detecting the software application accessing a particular application programming interface (API) within the virtual machine environment.

5. The method of claim 1, wherein the detecting the one or more actions includes detecting processor utilization within the virtual machine environment exceeding a threshold value.

6. The method of claim 1, wherein the detecting the one or more actions includes detecting memory utilization within the virtual machine environment exceeding a threshold value.

7. The method of claim 1, wherein the detecting the one or more actions includes detecting the software application attempting to access a particular file system location within the virtual machine environment.

8. The method of claim 1, wherein initiating capture of the video data produced by the virtual machine environment includes instructing an agent executing within the virtual machine environment to begin capturing the video data.

9. The method of claim 1, wherein executing the software application within the virtual machine environment is performed in response to detecting actions performed by the software application while executing on a particular computing device outside the virtual machine environment.

10. The method of claim 9, further comprising removing the particular computing device from the network in response to detecting the actions performed by the software application while executing on the particular computing device outside the virtual machine environment.

11. A system comprising:
   one or more processors configured to execute computer program instructions; and
   non-transitory computer storage media encoded with computer program instructions that, when executed by one or more processors, cause a computer device to perform operations comprising:
      executing a software application within a virtual machine environment, wherein the virtual machine environment provides emulated hardware resources to the executing software application, wherein one of the emulated hardware resources is a virtual display adaptor emulating a physical display adaptor to the executing software application;
      during execution of the software application, detecting one or more actions specified by a malicious application policy being performed by the software application within the virtual machine environment, the malicious application policy specifying one or more actions that will trigger video capture in the virtual machine environment executing the software application;

initiating capture, by the virtual display adaptor of the virtual machine environment, of a video data of behavior of a user interface of the execution of the software application that is executing within the virtual machine environment; and analyzing the captured video data for actions the software application is attempting to perform, and how the software application will present itself to a user, in order to determine whether the software application is a malicious application.

12. The system of claim 11, wherein the detecting the one or more actions includes detecting the software application attempting to access a particular network address or domain within the virtual machine environment.

13. The system of claim 11, wherein the detecting the one or more actions includes detecting the software application attempting to change a particular registry setting within the virtual machine environment.

14. The system of claim 11, wherein the detecting the one or more actions includes detecting the software application accessing a particular application programming interface (API) within the virtual machine environment.

15. The system of claim 11, wherein the detecting the one or more actions includes detecting processor utilization within the virtual machine environment exceeding a threshold value.

16. The system of claim 11, wherein the detecting the one or more actions includes detecting the software application attempting to access a particular file system location within the virtual machine environment.

17. The system of claim 11, wherein initiating capture of the video data produced by the virtual machine environment includes instructing an agent executing within the virtual machine environment to begin capturing the video data.

18. The system of claim 11, wherein executing the software application within the virtual machine environment is performed in response to detecting actions performed by the software application while executing on a particular computing device outside the virtual machine environment.

19. The system of claim 18, further comprising removing the particular computing device from the network in response to detecting the actions performed by the software application while executing on the particular computing device outside the virtual machine environment.

20. A non-transitory computer storage media encoded with computer program instructions that, when executed by one or more processors, cause a computer device to perform operations comprising:

executing a software application within the virtual machine environment, wherein the virtual machine environment provides emulated hardware resources to the executing software application, wherein one of the emulated hardware resources is a virtual display adaptor emulating a physical display adaptor to the executing software application;

during execution of the software application, detecting one or more actions specified by a malicious application policy being performed by the software application within the virtual machine environment, the malicious application policy specifying one or more actions that will trigger video capture in the virtual machine environment executing the software application;

initiating capture, by the virtual display adaptor of the virtual machine environment, of a video data of behavior of a user interface of the execution of the software application that is executing within the virtual machine environment; and analyzing the captured video data for actions the software application is attempting to perform, and how the software application will present itself to a user, in order to determine whether the software application is a malicious application.

21. The method of claim 1, wherein the video data produced by the virtual machine environment during execution of the software application represents a user interface that would be presented on a visual output device during execution of the software application on a physical computing device.

* * * * *